United States Patent
Burris et al.

(10) Patent No.: US 10,508,750 B2
(45) Date of Patent: Dec. 17, 2019

(54) HAMMER UNION BACK PRESSURE REGULATOR

(71) Applicant: DDS INVESTMENTS, LLC, Junction City, KS (US)

(72) Inventors: Mark Burris, Manhattan, KS (US); Bryce W. Burris, Manhattan, KS (US); Kenny Burris, Manhattan, KS (US); Randy Misenhelter, Iola, KS (US)

(73) Assignee: DDS Investments, LLC, Junction City, KS (US)

( * ) Notice: Subject to any disclaimer, the term of this patent is extended or adjusted under 35 U.S.C. 154(b) by 37 days.

(21) Appl. No.: 15/724,950

(22) Filed: Oct. 4, 2017

(65) Prior Publication Data

US 2019/0101222 A1 Apr. 4, 2019

(51) Int. Cl.
| | |
|---|---|
| *F16K 15/04* | (2006.01) |
| *F16K 27/02* | (2006.01) |
| *F16K 17/04* | (2006.01) |
| *G05D 1/00* | (2006.01) |

(52) U.S. Cl.
CPC ........ *F16K 27/0245* (2013.01); *F16K 15/044* (2013.01); *F16K 17/0406* (2013.01); *F16K 27/0209* (2013.01); *G05D 1/00* (2013.01)

(58) Field of Classification Search
CPC ................................ F16K 17/04; F16K 7/0209
USPC ........................................................ 137/535
See application file for complete search history.

(56) References Cited

U.S. PATENT DOCUMENTS

| | | | |
|---|---|---|---|
| 1,189,687 | A | 7/1916 | Hall |
| 2,415,258 | A * | 2/1947 | Parker ................ F16K 17/0406 137/536 |
| 2,523,826 | A | 9/1950 | Heinzelman |
| 2,757,741 | A | 8/1956 | O'Reilly |
| 2,972,359 | A | 2/1961 | Joukainen et al. |
| 3,219,052 | A | 11/1965 | Schaller et al. |
| 3,870,083 | A | 3/1975 | Nezat |
| 4,295,489 | A | 10/1981 | Arends et al. |
| 4,300,593 | A | 11/1981 | Ritter |
| 4,531,542 | A | 7/1985 | Looney |
| D282,562 | S | 2/1986 | Looney |
| 4,625,759 | A | 12/1986 | Craig |
| 4,779,642 | A | 10/1988 | Wood et al. |
| 4,846,215 | A | 7/1989 | Barree |
| 4,986,300 | A * | 1/1991 | Bremers ................ F16K 27/02 137/315.41 |
| 5,094,427 | A | 3/1992 | Solomon, Jr. |

(Continued)

OTHER PUBLICATIONS

Image of a prior art back pressure regulator (undated but admitted to be prior art).

(Continued)

*Primary Examiner* — P. Macade Nichols
(74) *Attorney, Agent, or Firm* — McAfee & Taft

(57) ABSTRACT

A hammer union back pressure regulator is provided. The hammer union back pressure regulator comprises a regulator body, a bonnet, a housing and a flow control member. The regulator body defines a flow inlet, a flow outlet, and a flow passage in fluid communication with the flow inlet and the flow outlet. The bonnet is coupled to the regulator body with a hammer union nut. The flow control member is configured to adjust the pressure at which the hammer union back pressure regulator will allow flow through the flow passage.

13 Claims, 4 Drawing Sheets

(56) References Cited

U.S. PATENT DOCUMENTS

| | | | |
|---|---|---|---|
| 5,176,176 | A | 1/1993 | Lewis et al. |
| 5,850,503 | A | 12/1998 | Onken |
| 5,901,749 | A | 5/1999 | Watson |
| 6,764,109 | B2 | 7/2004 | Richardson et al. |
| 6,945,569 | B1 | 9/2005 | Diaz et al. |
| 7,089,960 | B2 | 8/2006 | Maruta |
| 7,258,132 | B2 | 8/2007 | Henderson et al. |
| D602,566 | S | 10/2009 | Nimberger |
| D603,017 | S | 10/2009 | Nimberger |
| 8,733,392 | B2 | 5/2014 | Smith et al. |
| D707,332 | S | 6/2014 | Witkowski et al. |
| 8,870,233 | B2 | 10/2014 | Matzner et al. |
| 8,998,168 | B2 | 4/2015 | Witkowski et al. |
| 9,152,151 | B2 | 10/2015 | Olbrisch et al. |
| 9,249,650 | B2 | 2/2016 | Bruce et al. |
| 9,273,543 | B2 | 3/2016 | Baca et al. |
| 9,322,243 | B2 | 4/2016 | Baca et al. |
| 9,394,780 | B2 | 7/2016 | Bruce et al. |
| 9,447,890 | B2 | 9/2016 | Jennings et al. |
| 9,529,370 | B2 | 12/2016 | Smith et al. |
| 9,638,337 | B2 | 5/2017 | Witkowski et al. |
| 2004/0012661 | A1 | 1/2004 | Lin et al. |
| 2005/0279408 | A1 | 12/2005 | Henderson et al. |
| 2014/0203198 | A1 | 7/2014 | Jennings et al. |
| 2015/0129057 | A1 | 5/2015 | Shreve et al. |

OTHER PUBLICATIONS

Image of prior art lip seal (undated but admitted to be prior art).

\* cited by examiner

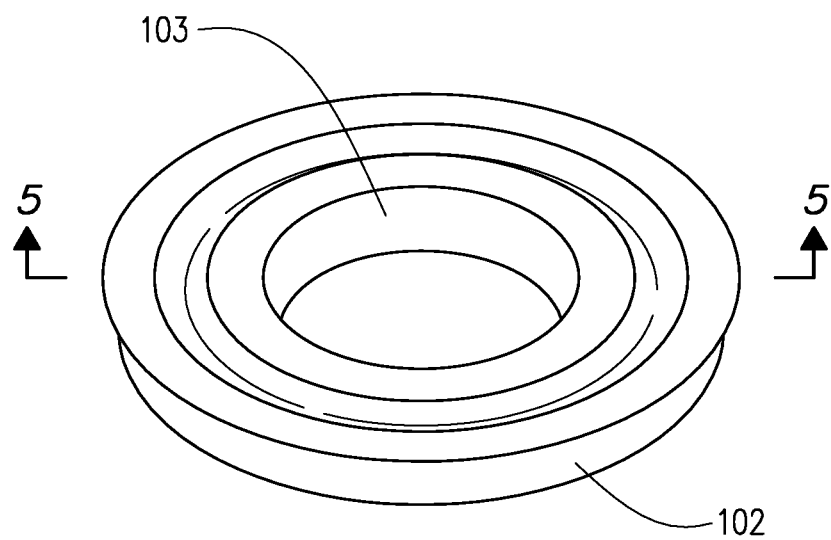
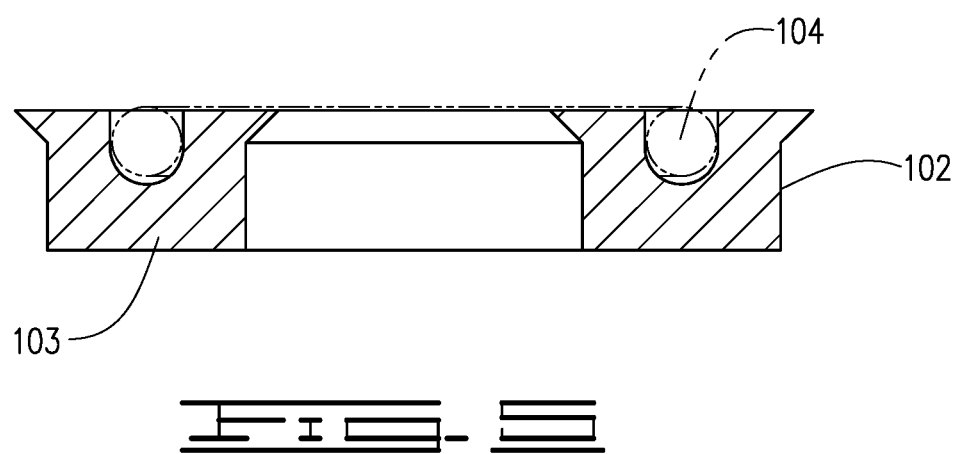
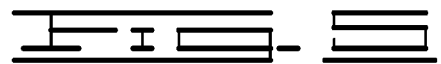

HAMMER UNION BACK PRESSURE REGULATOR

FIELD

The present disclosure generally relates to back pressure regulators used in the oil and gas industry, and more specifically to a hammer union back pressure regulator.

BACKGROUND

Crude oil processing systems typically have pressure regulators in place that maintain or control the pressure of a process fluid within the system. Maintaining and controlling the pressure of the fluid within the system ensures that pressure sensitive instruments are protected and that the system remains balanced throughout the process. Back pressure regulators are typically employed to hold pressure from downstream while allowing fluids to be pumped from upstream.

Under typical operating conditions, the internal components of back pressure regulators require regular maintenance. Back pressure regulators typically include multiple threadedly coupled sections and sealing surfaces. The sealing surfaces tend to wear out over time and result in leaks resulting in the need for regular maintenance. In most back pressure regulator configurations, the only way to access the internal components for maintenance is by removing the top half of the back pressure regulator, which requires unthreading at least two threaded connections. The process of removing the top half of the back pressure regulator tends to be time intensive because of the multiple threadedly coupled sections.

SUMMARY

In accordance with the present disclosure, an apparatus and method for accessing the internal components of a back pressure regulator are provided.

In one embodiment, a back pressure regulator is provided. The back pressure regulator comprises a regulator body, a bonnet, a housing or ball cage, and a flow control member. The regulator body defines a flow outlet and a flow passage that is in fluid communication with a flow inlet and the flow outlet. The bonnet is coupled to the regulator body with a hammer union nut. The ball cage is disposed in the regulator body and defines part of the flow passage. A flow restrictor assembly disposed within the housing comprises the flow control member, a biasing member, which may be for example a spring, a sleeve defining a valve seat, and a ball positioned to engage the valve seat. The ball will engage the valve seat to prevent flow from the flow inlet to the flow outlet until a predetermined pressure is reached at the flow inlet. The flow control member may comprise an adjustment screw configured to adjust a compression force applied to the spring, thereby adjusting the predetermined pressure.

In addition to or in the alternative to the previous embodiment, a back pressure regulator is provided. The back pressure regulator comprises a regulator body, which may be a tee union, a bonnet, a housing, a spring and an adjustment screw. The tee union defines a flow outlet and a flow passage that is in fluid communication with a flow inlet and the flow outlet. The bonnet is coupled to the tee union with a hammer union nut. An end surface of the regulator body is engageable with an end surface of the bonnet. The end surface of the regulator body may define a groove for receiving the end surface of the bonnet, and may have an O-ring seal received therein. The hammer union nut is equipped with a weep hole to allow excess pressure from the flow passage to escape. The housing defines part of the flow passage. A flow restrictor assembly comprises a valve seat, a ball, and the spring. The spring is engageable with the ball and operable to restrict the flow passage. A flow control member, which may be a spring adjustment screw, is configured to adjust the compression of the spring to set the pressure of the fluid flow at which flow through the flow passage is allowed.

In another embodiment, there is provided a method of assembly and disassembly of a back pressure regulator. The method of disassembly comprises a method for accessing and removing and replacing the internal components of the back pressure regulator. The method of assembly may comprise engaging an end surface of a bonnet with an end surface of a regulator body. The method may further comprise positioning internal components of the back pressure regulator in an interior of the regulator body. The internal components may comprise a ball cage, a sleeve defining a valve seat, a ball, and one or more spring keepers. Other internal components common to back pressure regulators may likewise be positioned in the regulator body. The method may include sliding the hammer union nut over the bonnet and connecting the hammer union nut to the regulator body. The method of accessing the internal components may comprise disconnecting the hammer union nut from the regulator body. The method may further comprise removing and replacing worn or damaged internal components of the regulator body, and re-assembling as described above.

BRIEF DESCRIPTION OF THE DRAWINGS

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure.

FIG. 4 is a perspective view of a lip seal.

FIG. 5 is a cross section of a lip seal.

DETAILED DESCRIPTION

Figure 1:
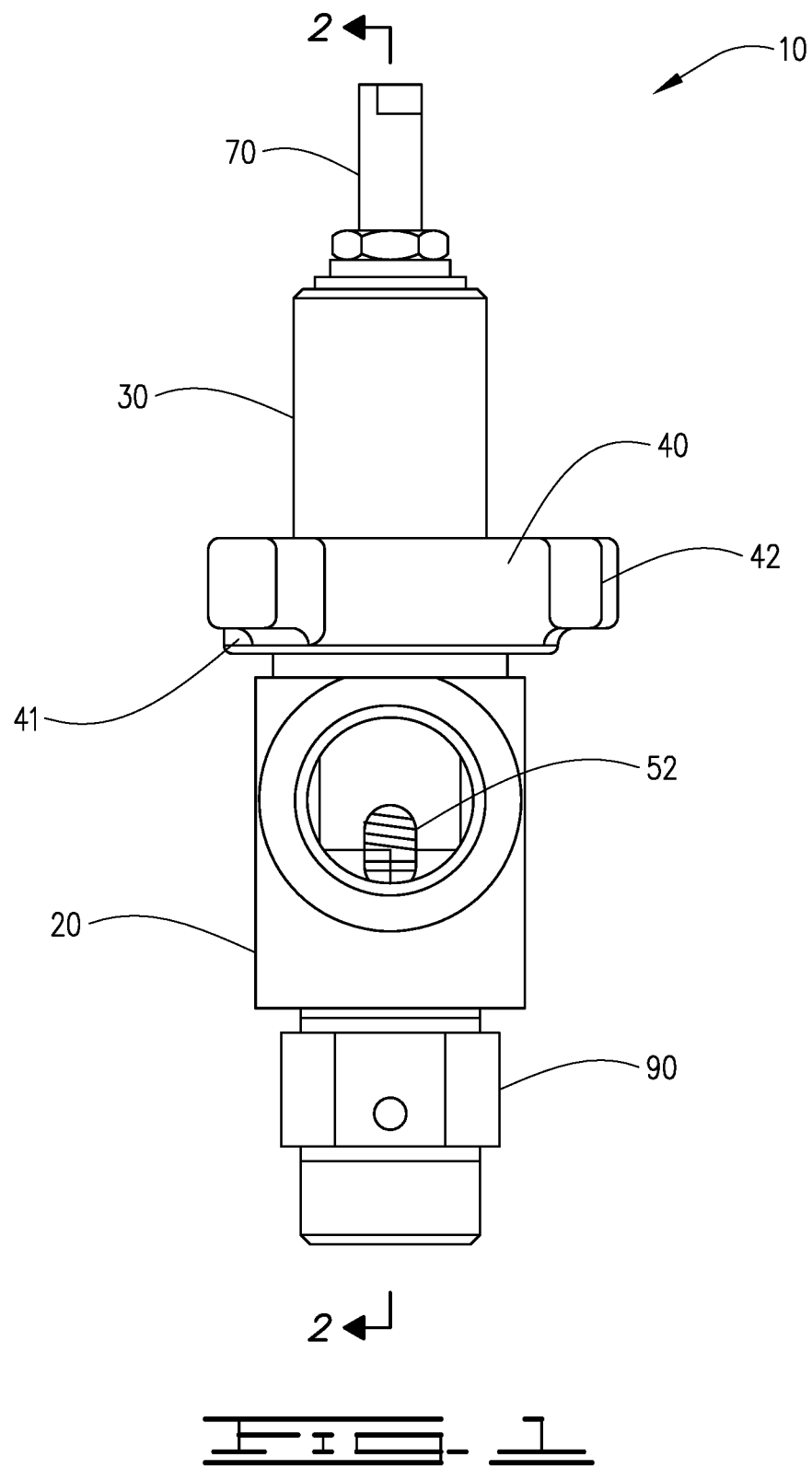
FIG. 1 is a front view of a hammer union back pressure regulator in accordance with one embodiment of the present disclosure.

The present disclosure may be understood more readily by reference to these detailed descriptions. For simplicity and clarity of illustration, where appropriate, reference numerals may be repeated among the different figures to indicate corresponding or analogous elements. In addition, numerous specific details are set forth in order to provide a thorough understanding of the various embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Figure 2:
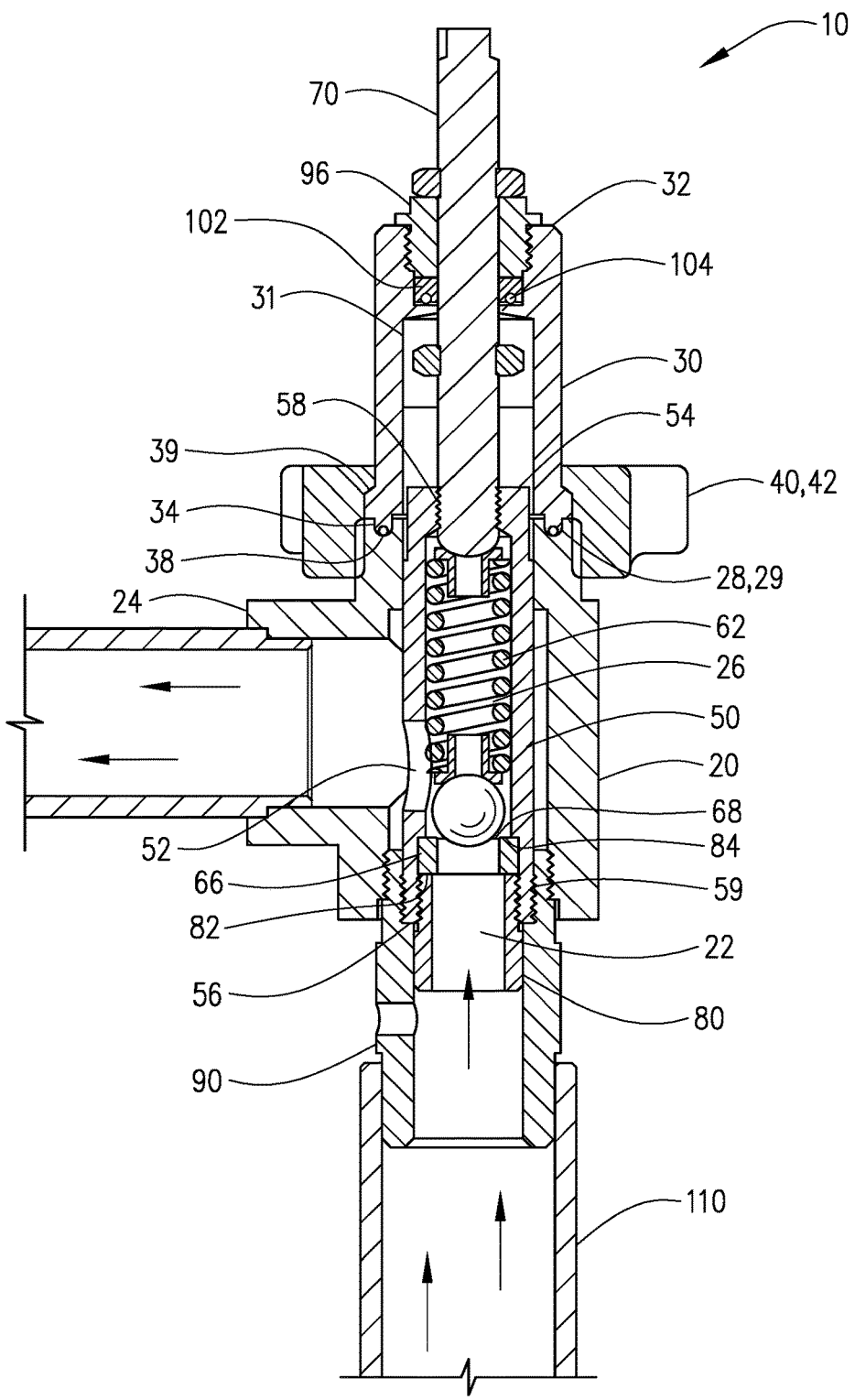
FIG. 2 is a cross-section view from line 2-2 of FIG. 1.
Figure 3:
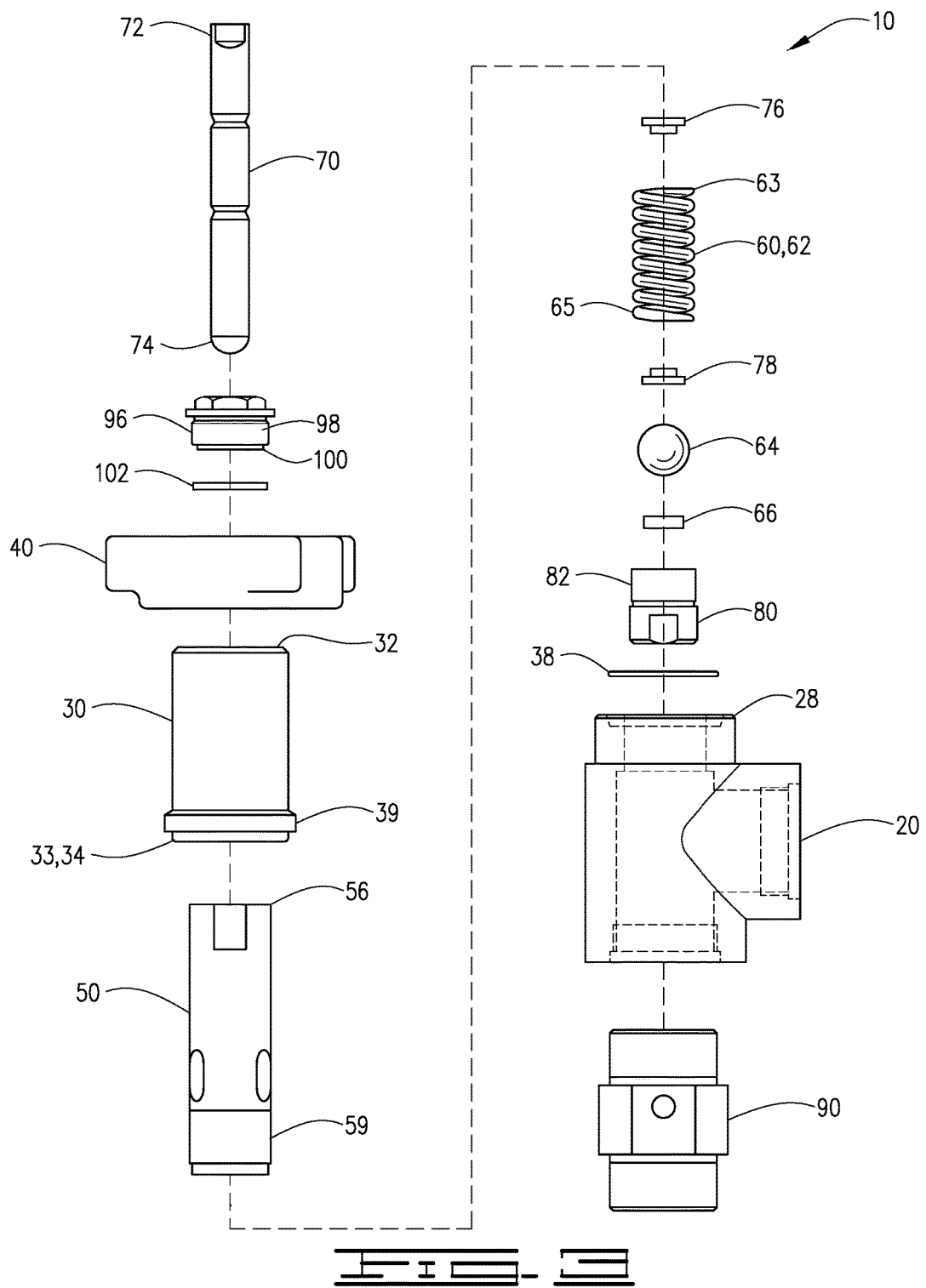
FIG. 3 is an exploded view of a hammer union back pressure regulator in accordance with one embodiment of the present disclosure.

Referring now to FIGS. 1-3, the hammer union back pressure regulator of the current disclosure is illustrated and generally designated by the numeral 10. As shown by the drawings, the general form of back pressure regulator 10 includes regulator body 20, bonnet 30, hammer union nut 40, housing 50, which may be referred to as ball cage 50, and flow restrictor assembly 60. Regulator body 20 defines a flow outlet 24 and flow passage 26. A flow inlet 22 is communicated with flow outlet 24 through flow passage 26. Flow inlet 22 generally will receive fluid through a nipple or coupling connected to regulator body 20. Regulator body 20 may comprise a first, or upper end surface 28. A groove 29 may be defined in end surface 28. In some embodiments, regulator body 20 may be a tee union as depicted in FIGS. 1-3.

Bonnet 30 is coupled to regulator body 20 with hammer union nut 40. Bonnet 30 has inner surface 31 and may have a first, or upper end 32, and a second, or lower end 33 which comprises a non-threaded end 33. A ridge 34 may be defined on second end 33. First end 32 may have internal threads for connection to a packing nut as described herein. End surface 28 of regulator body 20 is engageable with second end 33 of bonnet 30. In some embodiments an O-ring 38 is positioned in groove 29. Ridge 34 will nest in groove 28 when bonnet 30 is coupled to regulator body 20, and will engage O-ring 38. Bonnet 30 may have a shoulder 39 defined on the outer surface thereof.

Hammer union nut 40 has a plurality of lugs 42 thereon which may be used to rotate hammer union nut 40. Hammer union nut 40 will slide over bonnet 30 and will threadedly connect to threads on regulator body 20. Hammer union nut 40 will be rotated to connect to regulator body 20, and will connect bonnet 30 thereto by engaging shoulder 39 on bonnet 30 and pulling bonnet 30 into sealing engagement with regulator body 20. Hammer union nut 40 may be equipped with a weep hole 41 to allow excess pressure within flow passage 26 of back pressure regulator 10 to escape during removal of the hammer union nut 40. Once hammer union nut 40 is rotated to disconnect from pressure regulator body 20, weep hole 41 will allow excess pressure in flow passage 26 to escape therethrough.

Ball cage 50 is disposed in regulator body 20 and defines part of flow passage 26. Ball cage 50 defines openings 52 therethrough. Ball cage 50 has first, or upper end 54 and second, or lower end 56. Upper end 54 may have internal threads 58 and lower end 56 may have threads 59 thereon. Lower end 56 may have internal threads as well. Flow restrictor assembly 60 of back pressure regulator 10 comprises a spring 62 and flow plug or ball 64. Spring 62 has first end 63 and second end 65. Flow restrictor assembly 60 may also comprise a sleeve 66 which defines a valve seat 68 thereon.

A flow control member 70 with first and second ends 72 and 74 is configured to adjust the compression of spring 62. Flow control member 70 which may be an adjustment screw is configured to apply a compressive force with second end 74 to first end 63 of spring 62. Flow control member 70 is connected to ball cage 50 at threads 58. Spring keepers 76 and 78 may be disposed in ball cage 50 and positioned at the first and second ends 63 and 65 of spring 62. Flow control member 70 will engage spring keeper 76 to apply a compressive force to spring 62 or in other embodiments may directly engage spring 62.

A valve plug 80 is connected to internal threads on ball cage 50 at the lower end 56 thereof. An upper end 82 of valve plug 80 engages valve sleeve 66. Valve sleeve 66 is held in place by valve plug 80 and a shoulder 84 defined on an inner surface of ball cage 50. A nipple 90 is threadedly connected to exterior threads 59 on ball cage 50 at lower and 56, and is threadedly connected to regulator body 20. Nipple 90 communicates fluid to flow inlet 22.

A packing nut 96 is threaded into bonnet 30 at the first end 32 thereof. Packing nut 96 includes threads 98 thereon, with an unthreaded ring 100 extending therefrom. Ring 100 has a loaded seal 102 thereon. Loaded seal 102 may be referred to as a loaded O-ring, or loaded lip seal 102. Lip seal 102 comprises a generally U-shaped cup 103 with an O-ring seal 104 loaded therein. Although other materials may be used, U-shaped cup 103 may comprise, for example, urethane and O-ring 104 may comprise, for example, nitrile rubber. Lip seal 102 will be positioned in a space 105 between packing nut 96 and ball cage 50 and will provide an annular seal. Lip seal 102 is disposed about adjustment screw 70 and will seal against adjustment screw 70, the upper end of ball cage 50 and the inner surface 31 of bonnet 30. In existing products, rope packing is utilized which does not efficiently and adequately prevent leaking. Lip seal 102 of the current disclosure virtually eliminates leaking which improves safety and is more environmentally sound.

In the operation of back pressure regulator 10, high pressure fluid enters back pressure regulator 10 through flow inlet 22. Back pressure regulator 10 may be connected to a pipe 110 that receives fluid from a well. Back pressure regulator 10 will not allow fluid to flow therethrough above a certain, predetermined pressure. For example, if the components downstream from back pressure regulator 10 are designed for pressures of 1000 psi or less, and the pressure in the well is 1500 psi, pressure regulator 10 will restrict flow such that the flow through outlet 26 is limited to 1000 psi. Ball 64 will be lifted from seat 68 to allow flow through flow passage 26 including openings 52 in ball cage 50 and flow outlet 24. Fluid will pass through flow passage 26 and will not allow flow downstream above a predetermined pressure. The force applied to ball 62 is adjustable with flow control member 70. Flow control member 70 can be rotated in threads 58 to increase or decrease the compressive force applied to spring 62 so that the predetermined pressure can be adjusted to the desired pressure. Back pressure regulator 10 can also be connected to a pipe with continuous flow therethrough to limit the pressure in the pipe. In such a case, back pressure regulator 10 would be connected to the pipe and would connect to the pipe so that if fluid flow in the pipe reaches a predetermined pressure, ball 64 will be lifted to allow flow through flow outlet 26. In such an embodiment back pressure regulator 10 controls pressure in the pipe itself, as opposed to limiting downstream pressure.

The high pressure fluid to which the back pressure regulator is exposed can wear down the internal components thereof. The assembly and disassembly of back pressure regulator 10 is simple and efficient, and provides easy access to the internal components for repair and replacement thereof.

The method of assembling the back pressure regulator 10 may comprise positioning ball 64 against valve seat 68 in regulator body 20 and coupling bonnet 30 to regulator body 20 with a hammer union nut 40. The method may further comprise placing a ball cage 50 in the regulator body 20 and engaging the ball 64 with a spring 62 prior to coupling the bonnet 30 to the regulator body 20. A method of accessing the internal components comprises disconnecting the hammer union nut 40 from the regulator body 20 by rotating the hammer union nut 40 with a hammer, or other appropriate tool to disconnect from the regulator body 20. The bonnet 30 can then simply be lifted to disengage from regulator body 20. The internal components, for example spring 62, ball 64, sleeve 66, spring keepers 76 and 78, along with other internal parts can be removed and replaced. Thus, the method of accessing may include only the steps of disconnecting the hammer union nut 40 and lifting the bonnet 30 to expose the internal components. Only one component, the hammer union nut 40, must be unthreaded. Current back pressure regulators require unthreading of multiple components, which can be unwieldy, and can take significant time.

In some embodiments, regulator body 20 and bonnet 30 are at least partially formed of, but not limited to, alloy steel. In additional embodiments, each individual component of back pressure regulator 10 is at least partially formed, but not limited to, alloy steel, stainless steel, or other iron byproducts known by those of ordinary skill in the art.

Therefore, the present disclosure is well adapted to attain the ends and advantages mentioned, as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present disclosure. While apparatus and methods may be described in terms of "comprising," "containing," "having," or "including" various components or steps, the apparatus and methods can also, in some examples, "consist essentially of" or" consist of the various components and steps. Also, the terms in the claims have their plain, ordinary meaning unless otherwise explicitly and clearly defined by the specification.

What is claimed:

1. A back pressure regulator, comprising:
   a regulator body defining a flow inlet, a flow outlet, and a flow passage communicating the flow inlet with the flow outlet;
   a bonnet coupled to the regulator body with a hammer union nut;
   a flow restrictor assembly configured to prevent flow from the flow inlet to the flow outlet until a predetermined pressure is reached at the flow inlet;
   a flow control member configured to adjust the predetermined pressure, the flow control member and an inner surface of the bonnet defining an annular space therebetween; and
   a lip seal filling the annular space.

2. The back pressure regulator of claim 1, wherein the regulator body is a tee union.

3. The back pressure regulator of claim 1, further comprising:
   a ball cage disposed in the bonnet; and
   a ball positioned in the ball cage, wherein the ball blocks flow through the flow inlet until the predetermined pressure is reached.

4. The back pressure regulator of claim 3, wherein the flow restrictor assembly comprises:
   a sleeve disposed in the regulator body and defining a part of the flow passage, the sleeve defining a valve seat thereon;
   the ball being engageable with the valve seat; and
   a spring configured to urge the ball against the valve seat to prevent flow to the flow outlet until the predetermined pressure is reached.

5. The back pressure regulator of claim 4, wherein the flow control member is configured to adjust a compression of the spring to set the predetermined pressure.

6. The back pressure regulator of claim 4, the sleeve and spring being disposed in the ball cage.

7. The back pressure regulator of claim 1, wherein the hammer union nut is threaded to the regulator body, and wherein the hammer union nut defines a weep hole configured to release excess pressure from the flow passage upon unthreading the hammer union nut.

8. A back pressure regulator comprising:
   a regulator body defining a flow inlet, a flow outlet and a flow passage communicating the flow inlet with the flow outlet;
   a bonnet having an end surface engageable with an end surface of the regulator body;
   a hammer union nut disposed about the bonnet and threadedly connected to the regulator body; and
   a flow plug positioned in the flow passage configured to prevent flow from the inlet through the flow passage to the outlet until a predetermined pressure is reached at the flow inlet, an end surface of the regulator body defining a groove therein, wherein an O-ring is positioned in the groove and the end surface of the bonnet engages the O-ring when the hammer union nut is threaded to the regulator body; and
   wherein a ridge on the end surface of the bonnet is received in the groove and engages the O-ring seal when the hammer union nut is threaded to the regulator body.

9. The back pressure regulator of claim 8 further comprising a flow control member configured to adjust the predetermined pressure.

10. The back pressure regulator of claim 8, further comprising:
    a valve seat, the flow plug being engageable with the valve seat; and
    a biasing means for urging the flow plug into the valve seat to the block flow through the flow path.

11. A back pressure regulator comprising:
    a regulator body defining a flow inlet, a flow outlet and a flow passage communicating the flow inlet with the flow outlet;
    a bonnet having an end surface engageable with an end surface of the regulator body;
    a hammer union nut disposed about the bonnet and threadedly connected to the regulator body;
    a flow plug positioned in the flow passage configured to prevent flow above a predetermined pressure from the inlet through the flow passage to the outlet;
    a valve seat, the flow plug being engageable with the valve seat; and
    a biasing means for urging the flow plug into the valve seat to block flow through the flow path; and
    the end surface of the regulator body defining a groove therein, wherein an O-ring is positioned in the groove and the end surface of the bonnet engages the O-ring when the hammer union nut is threaded to the regulator body.

12. The back pressure regulator of claim 11 further comprising a flow control member configured to adjust the predetermined pressure.

13. The back pressure regulator of claim 11, wherein a ridge on the end surface of the bonnet is received in the groove and engages the O-ring seal when the hammer union nut is threaded to the regulator body.

* * * * *